United States Patent

Souissi et al.

[11] Patent Number: 6,167,268
[45] Date of Patent: Dec. 26, 2000

[54] METHOD AND APPARATUS FOR CONTROLLING SCANNING OF A SUBSCRIBER UNIT

[75] Inventors: Slim Souissi, Fort Worth; Jheroen Pieter Dorenbosch, Paradise; Robert Louis Breeden, Azle, all of Tex.

[73] Assignee: Motorola, Inc., Schaumburg, Ill.

[21] Appl. No.: 09/246,996

[22] Filed: Feb. 16, 1999

[51] Int. Cl.[7] .................................................. H04Q 7/20
[52] U.S. Cl. .......................... 455/434; 455/440; 455/437; 455/456
[58] Field of Search ..................................... 455/456, 436, 455/437, 434, 432, 440, 343, 161.1, 38.3, 515, 161.3, 181.1, 179.1; 342/457

[56] References Cited

U.S. PATENT DOCUMENTS

| | | | |
|---|---|---|---|
| 5,093,926 | 3/1992 | Sasuta . | |
| 5,392,458 | 2/1995 | Sasuta et al. . | |
| 5,404,376 | 4/1995 | Dent | 342/457 |
| 5,442,805 | 8/1995 | Sagers et al. . | |
| 5,794,146 | 8/1998 | Sevcik et al. | 455/434 |
| 5,857,155 | 1/1999 | Hill et al. . | |
| 5,913,168 | 6/1999 | Moreau et al. | 455/437 |
| 5,915,221 | 6/1999 | Sawyer et al. | 455/437 |
| 5,933,114 | 8/1999 | Eizenhofer et al. | 455/456 |
| 5,953,667 | 9/1999 | Kauppi | 455/440 |
| 6,006,096 | 12/1999 | Trompower | 455/456 |
| 6,038,451 | 3/2000 | Syed et al. | 455/456 |
| 6,052,590 | 8/1998 | Hicks et al. | 455/161.1 |

*Primary Examiner*—Reinhard J. Eisenzopf
*Assistant Examiner*—Greta J. Fuller
*Attorney, Agent, or Firm*—R. Louis Breeden

[57] ABSTRACT

A location is determined (402) at which a subscriber unit (122, 300) communicating with a first wireless system is positioned. A distance between the location and a second wireless system preferred by the subscriber unit is calculated (404), and, based upon the distance, it is decided (408) whether the subscriber unit will scan for a signal from the second wireless system.

17 Claims, 5 Drawing Sheets

METHOD AND APPARATUS FOR CONTROLLING SCANNING OF A SUBSCRIBER UNIT

FIELD OF THE INVENTION

This invention relates in general to wireless systems, and more specifically to a method and apparatus for controlling scanning of a subscriber unit.

BACKGROUND OF THE INVENTION

Demands are being made on wireless systems to deliver increasing amounts of data to wireless devices. One solution for providing higher data rates is the provision of localized high speed systems within a wide area, slower speed system. Roaming from a localized high speed system to the wide area system is not considered to present a problem. Because the coverage of the wide area system is much greater than that of the localized system, the wireless device simply starts looking for a signal from the wide area system once coverage of the localized system is lost. Roaming from the wide area system to the localized system is more difficult. How does the wireless device detect the presence of the localized system? How frequently does the wireless device need to scan for a signal from the localized system? How can the wireless device eliminate unnecessary scanning, which wastes battery power?

What is needed is a method and apparatus that can answer these questions. A method and apparatus that can intelligently control scanning for localized systems to eliminate unnecessary scanning without increasing latency is needed.

SUMMARY OF THE INVENTION

An aspect of the present invention is a method for controlling scanning of a subscriber unit communicating with a first wireless system. The method comprises the steps of determining a location at which the subscriber unit is positioned, calculating a distance between the location and a second wireless system preferred by the subscriber unit, and deciding whether the subscriber unit will scan for a signal from the second wireless system, based upon the distance.

Another aspect of the present invention is a subscriber unit communicating with a first wireless system for controlling scanning. The subscriber unit comprises a receiver for receiving the first wireless system, and a processing system coupled to the receiver for controlling the receiver, the processing system comprising a memory. The processing system is programmed to determine a location at which the subscriber unit is positioned, to calculate a distance between the location and a second wireless system preferred by the subscriber unit, and to decide whether the subscriber unit will scan for a signal from the second wireless system, based upon the distance.

Another aspect of the present invention is a controller in a first wireless system communicating with a subscriber unit utilizing two-way communication, the controller for controlling scanning of the subscriber unit. The controller comprises a base station interface for cooperating with a base station to provide two-way communications with the subscriber unit, and a processing system coupled to the base station interface for controlling the base station interface, the processing system comprising a memory. The processing system is programmed to receive from the subscriber unit a location at which the subscriber unit is positioned, and to calculate a distance between the location and a second wireless system preferred by the subscriber unit. The processing system is further programmed to make a decision as to whether the subscriber unit will scan for a signal from the second wireless system, based upon the distance, and to communicate the decision to the subscriber unit.

DETAILED DESCRIPTION OF THE DRAWINGS

Figure 1:
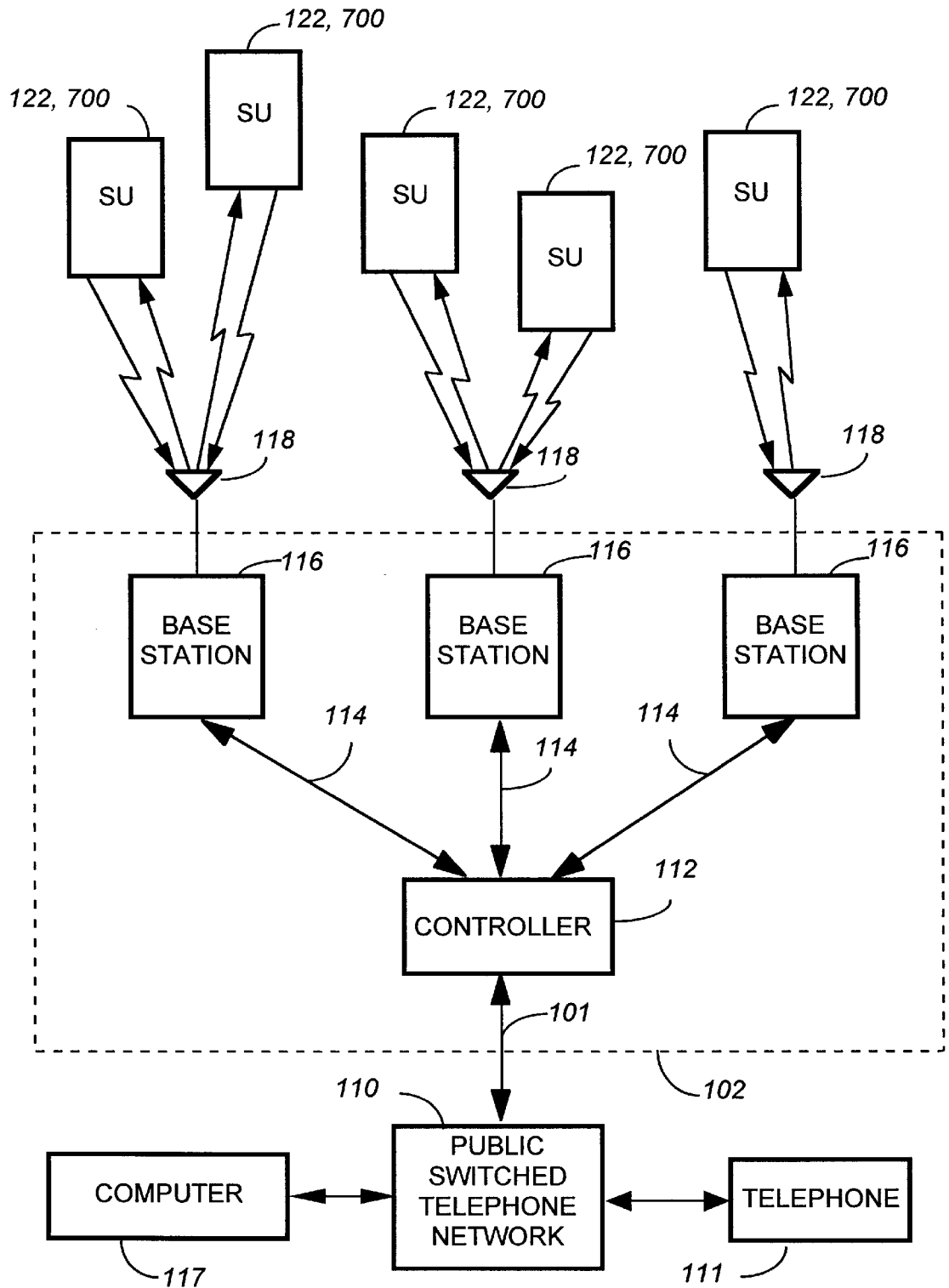
FIG. 1 is an electrical block diagram of an exemplary wireless system in accordance with the present invention.

FIG. 1 is an electrical block diagram of an exemplary wireless system in accordance with the present invention, comprising an infrastructure portion 102 including a controller 112 and a plurality of conventional base stations 116, the communication system also including a plurality of subscriber units 122, 700. The base stations 116 preferably communicate with the subscriber units 122, 700 utilizing conventional radio frequency (RF) techniques, and are coupled by conventional communication links 114 to the controller 112, which controls the base stations 116.

The controller 112 is preferably a combination of a Choreographer!® network management device, a Wireless Messaging Gateway (WMG™) Administrator!™ terminal, an RF-Usher!™ multiplexer, and an RF-Conductor!® message distributor manufactured by Motorola, Inc., and, in one embodiment, utilizes software modified in accordance with the present invention. The base stations 116 are preferably a combination of the RF-Orchestra!™ transmitter and the RF-Audience!® receiver manufactured by Motorola, Inc. The subscriber units 122, 700 are preferably similar to PageWriter® 2000 data subscriber units, also manufactured by Motorola, Inc., and also utilize software modified in accordance with the present invention. It will be appreciated that other similar hardware can be used as well for the controller 112, the base stations 116, and the subscriber units 122, 700.

Each of the base stations 116 transmits RF signals to the subscriber units 122, 700 via an antenna 118. The base stations 116 preferably each receive RF signals from the plurality of subscriber units 122, 700 via the antenna 118. The RF signals transmitted by the base stations 116 to the subscriber units 122, 700 (outbound messages) comprise selective call addresses identifying the subscriber units 122, 700, and data messages originated by a message originator, as well as commands originated by the controller 112 for adjusting operating parameters of the radio communication system. The RF signals preferably transmitted by the subscriber units 122, 700 to the base stations 116 (inbound messages) comprise responses that include scheduled messages, such as positive acknowledgments (ACKs) and negative acknowledgments (NAKs), and unscheduled messages, such as registration requests and requests for items of information.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), and the Internet, to name a few, can be used for receiving selective call originations.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. While the wireless system depicted in FIG. 1 is a two-way wireless messaging system, the first embodiment of the present invention also is applicable to a one-way wireless messaging system, as well. Both the first and second embodiments are applicable to a cellular telephone system as well.

Figure 2:
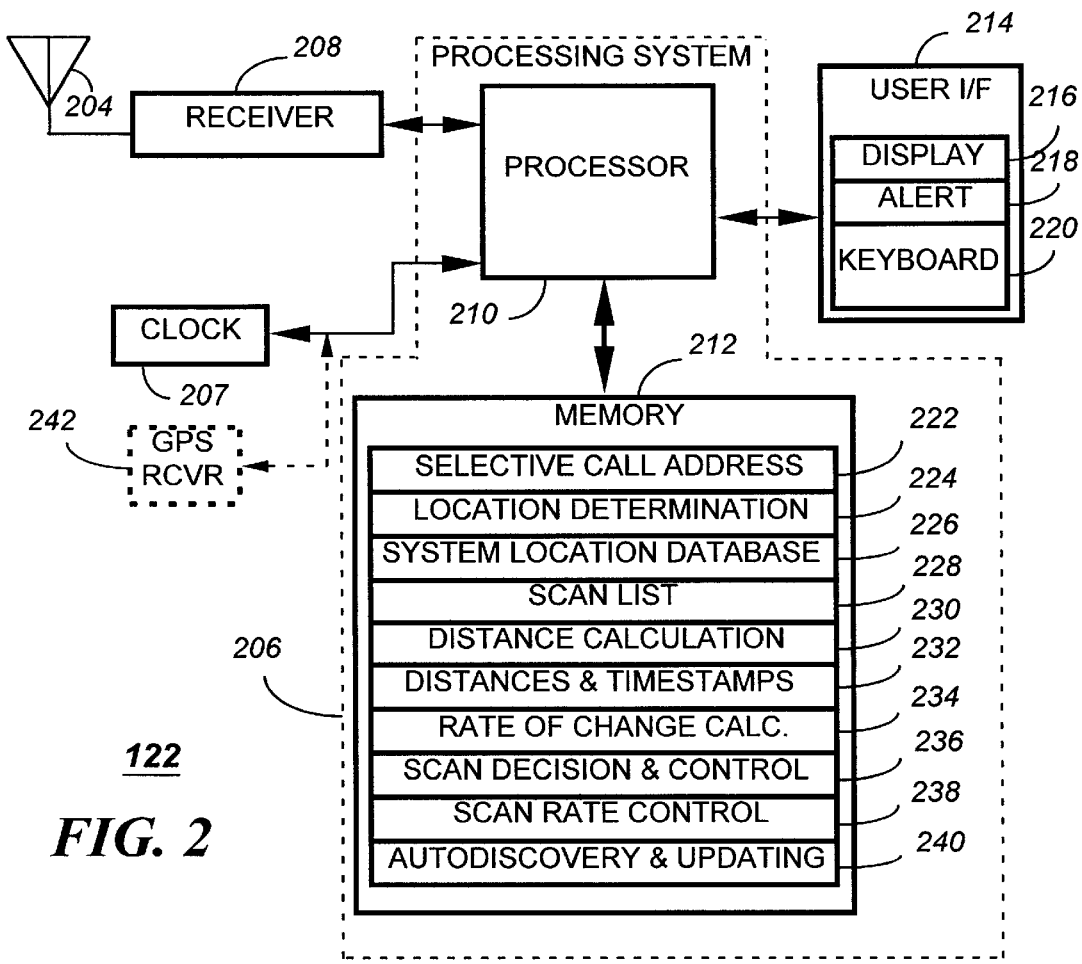
FIG. 2 is an electrical block diagram of an exemplary subscriber unit in accordance with a first embodiment of the present invention.

FIG. 2 is an electrical block diagram of an exemplary subscriber unit 122 in accordance with the first embodiment of the present invention. The first embodiment is applicable to both two-way and one-way wireless systems, as no communications from the subscriber unit 122 to the fixed portion are required by the first embodiment. The subscriber unit 122 is thus depicted as a one-way subscriber unit. The subscriber unit 122 comprises an antenna 204 for intercepting an outbound message. The antenna 204 is preferably coupled to a conventional receiver 208 for receiving the outbound message. The receiver 208 is coupled to a processing system 206 for processing the outbound message and for controlling the subscriber unit 122 in accordance with the present invention. A user interface 214 preferably is also coupled to the processing system 206 for interfacing with a user. The user interface 214 comprises a conventional display 216 for displaying the outbound message, a conventional alert element 218 for alerting the user when the outbound message arrives, and a conventional keyboard 220 for controlling the subscriber unit 122. A conventional clock 207 is also coupled to the processing system 206 for supporting time keeping requirements of the subscriber unit 122. In one embodiment, a global positioning satellite (GPS) receiver 242 is coupled to the processing system 206 for supplying location information thereto.

The processing system 206 comprises a conventional processor 210 and a conventional memory 212. The memory 212 comprises data and software elements for programming the processing system 206 in accordance with the present invention. The memory 212 preferably includes a selective call address 222 to which the subscriber unit 122 is responsive. In addition, the memory 212 includes a location determination program 224 for programming the processing system 206 to determine its location through well-known techniques. An inexpensive technique, for example, is the use of a transmitted color code associated with each base station 116 to identify the location corresponding to the coverage area of the base station 116. Other location-associated identifiers, such as the service provider identifier (SPID), the zone identifier, and the subzone identifier, can be utilized as well to identify the location. A more accurate, but somewhat more expensive, technique is to build the global positioning satellite (GPS) receiver 242 into the subscriber unit 122 for determining the Cartesian coordinates of the location of the subscriber unit 122.

The memory 212 further comprises a system location database 226 including system identifiers and location coordinates of wireless systems of interest to the subscriber unit 122. Update information for the system location database 226 is preferably downloaded over the air when the subscriber unit 122 enters an area not described by existing information in the system location database 226. The memory 212 also includes a scan list 228 comprising system identifiers, priorities, and frequencies of systems to which the subscriber unit 122 can roam. The memory 212 also includes a distance calculation program 230 for calculating the distance between the subscriber unit 122 and other wireless systems in the system location database 226. The memory 212 further comprises space for storing distances and timestamps 232 calculated and stored by the distance calculation program 230. In addition, the memory 212 includes a rate of change calculation program 234 for calculating the rate of change of a plurality of distances to a second wireless system, determined at a plurality of times. The memory 212 further comprises a scan decision and control program 236 for programming the processing system 206 to decide whether to scan ones of the wireless systems in the database 226, depending on their distance from the subscriber unit 122. The memory 212 also includes a scan rate control program 238 for controlling the rate of scanning in accordance with the present invention. In addition, the memory 212 includes an autodiscovery and updating program 240 for discovering preferred systems that are not in the system location database 226, and for adding the system location information for such systems to the database. Operation of the subscriber unit 122 in accordance with the first embodiment of the present invention will be described in detail further below.

Figure 3:
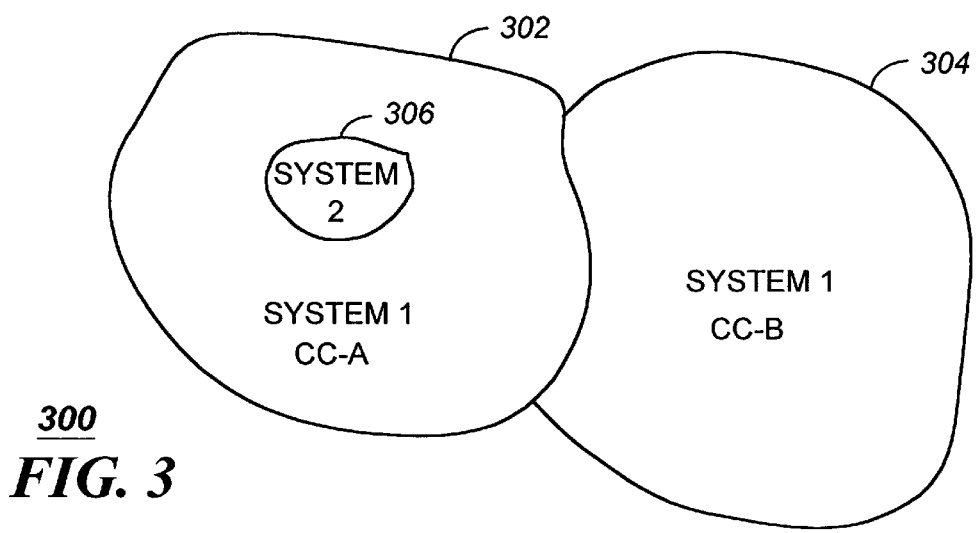
FIG. 3 is an exemplary coverage diagram depicting overlapping coverage of first and second wireless systems.

FIG. 3 is an exemplary coverage diagram 300 depicting overlapping coverage of first and second wireless systems. In this example, transmitter color codes are used to determine the location of the subscriber unit 122. The diagram 300 depicts the first system having first and second coverage areas 302, 304 transmitting color codes "A" and "B", respectively. The second system has a small coverage area 306 within the first coverage area 302. The second system is preferred by the subscriber unit 122, as defined by the scan list 228. The second system, for example, could be a private wireless system at the place of business of the user of the subscriber unit 122. In accordance with the present invention, when the subscriber unit 122 is receiving color code "A", the subscriber unit 122 background scans the frequency assigned to the second system (as determined from the scan list 228), searching for a usable signal, and, upon finding a usable signal, switches to the second system. On the other hand, when the subscriber unit 122 is receiving a color code different from color code "A", such as color code "B", the subscriber unit 122 concludes that it is not near the second system, and thus does not background scan for that system, thereby advantageously saving battery power.

Figure 4:
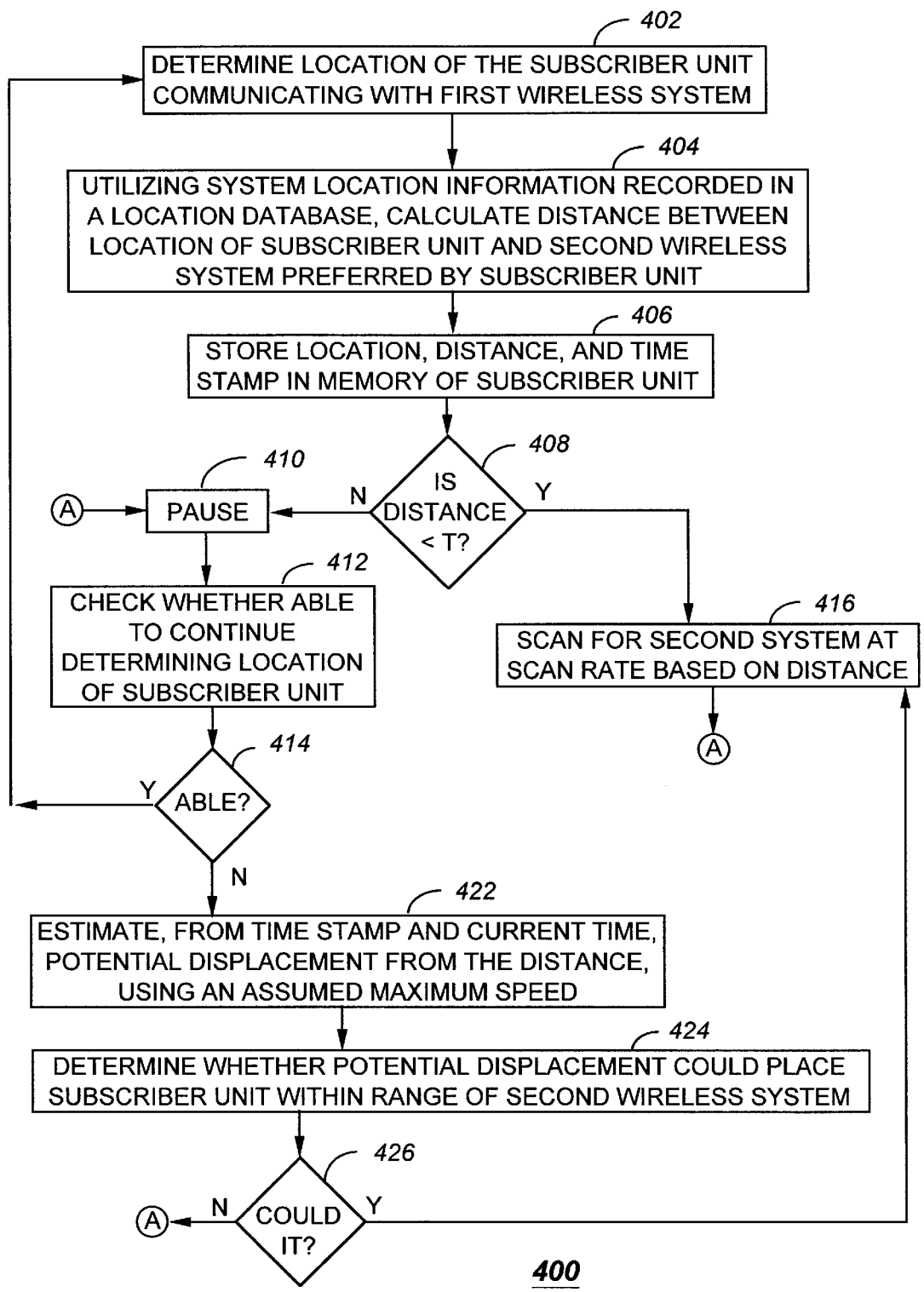
FIG. 4 is a flow diagram depicting operation of the wireless system in accordance with the present invention.

FIG. 4 is a flow diagram 400 depicting operation of the wireless system in accordance with the present invention. The flow begins when the processing system 206 determines 402 from a first wireless system the location of the subscriber unit 122 through one of the well-known techniques described herein above. It will be appreciated that the first wireless system can be a system like that depicted in FIG. 1. The first wireless system can also be the GPS satellite system, when the subscriber unit 122 is equipped with the GPS receiver 242. Then, using system location information recorded in the system location database 226, the processing system 206 calculates 404 the distance between the location of the subscriber unit 122 and a second wireless system preferred by the subscriber unit 122. The manner in which the distance calculation is done depends upon the location technique. When the location technique is an identifier-associated technique such as a transmitter color code, the distance is preferably calculated as "near" when receiving the color code that is transmitted by the first wireless system in the vicinity of the second system, and "far" otherwise. When the location technique is by GPS receiver, then the Cartesian coordinates of the location of the subscriber unit 122 and the Cartesian coordinates of the center of the second system preferably are used to calculate the distance through well-known trigonometric techniques.

The processing system 206 then stores 406 the location, the distance, and a time stamp in the memory space for storing distances and timestamps 232. The processing system 206 checks 408 whether the distance is less than a threshold. (In a GPS-equipped subscriber unit 122, the threshold is preferably stored with the location information in the system location database 226 and is determined from the nominal coverage distance of the second wireless system, e.g., the threshold equals the nominal coverage distance plus one kilometer. It will be appreciated that, alternatively, the threshold can be a predetermined distance.) If the distance is less than the threshold, the processing system 206 controls the receiver 208 to scan 416 for the second system at a scan rate based on the distance, e.g., more frequent scans as the distance becomes shorter. If the distance is not less than the threshold, the processing system 206 does not activate scanning at this time, advantageously saving battery power. In either event, the processing system 206 pauses 410, e.g., for one minute, before making another measurement.

The processing system 206 then checks 412 whether the subscriber unit 122 is still able to continue determining its location, i.e., still receiving a usable signal from the first wireless system. If so, at step 414 the flow returns to step 402 to redetermine the location. If not, at step 414 the flow moves to step 422, where the processing system 206 estimates, from the time stamp and the current time, a potential displacement from the distance, using an assumed maximum speed. In one embodiment, the assumed maximum speed is predetermined, e.g., 40 miles per hour (65 kilometers per hour). In another embodiment, the assumed maximum speed value is based upon the location. For example, a lower value can be stored with the location information when the corresponding location is an in-city location, while a higher value can be used for a rural location. The processing system 206 then determines 424 whether the potential displacement could place the subscriber unit 122 within range of the second wireless system. If so, the flow returns to step 416 to scan for the second wireless system. If not, the flow returns to step 410. While the preceding has described "a" second system, it will be appreciated that there can be a plurality of second systems that are preferred by the subscriber unit 122. In that case, the calculations and decisions preferably are repeated for each of the plurality of second systems until a closest one can be determined for scanning.

Figure 5:
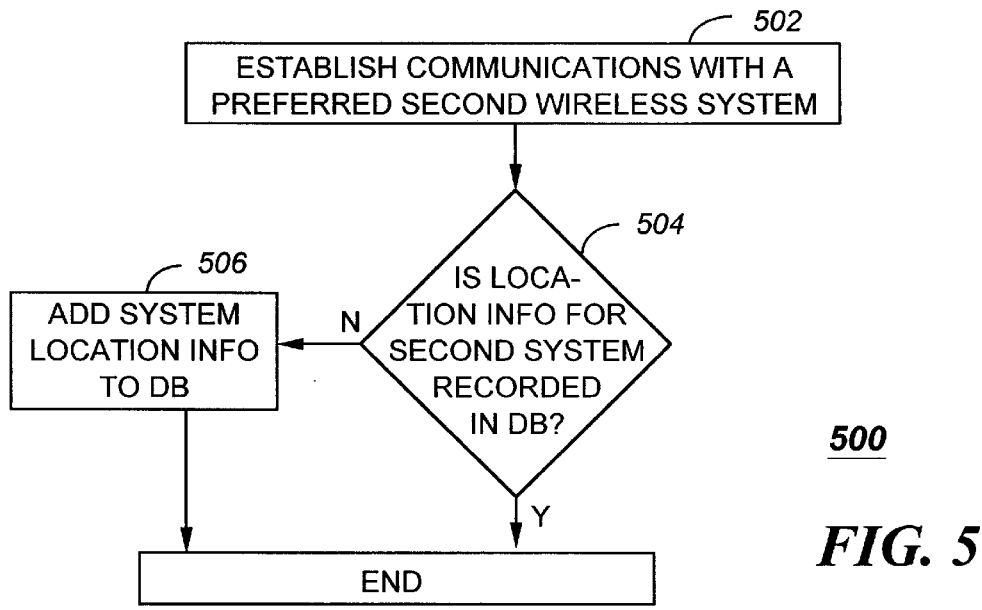
FIG. 5 is a flow diagram depicting a discovery technique in accordance with the present invention.

FIG. 5 is a flow diagram 500 depicting a discovery technique in accordance with the present invention. First, the subscriber unit 122 establishes 502 communications with a preferred second wireless system. This can occur, for example, when the subscriber unit 122 initiates a normal, high latency background scan, searching for systems defined in the scan list 228. The processing system 206 then checks 504 whether location information for the second wireless system is recorded in the system location database 226. If so, the process ends. If not, the processing system 206 adds the system location information to the system location database 226. For identifier-associated locations, the location information comprises the identifier (e.g., transmitter color code, subzone ID, zone ID, or SPID) most recently received from the first wireless system.

For GPS determined locations, the locating process is somewhat more complex, because the most desirable location to store for the second wireless system is its center, not just any in-range location. To estimate the center of the second wireless system, the processing system 206 preferably periodically measures and stores a signal quality, e.g., signal strength, of the received signal. When the currently measured signal quality is better than the last stored signal quality, the location information in the system location database 226 recorded for the second wireless system is updated with the current GPS location. In this manner, the center of the second wireless system can be approximated, provided that the subscriber unit 122 at some time moves near the center of the second wireless system. Alternatively, a predetermined minimum signal quality can be required before recording the location information for the second system.

Figure 6:
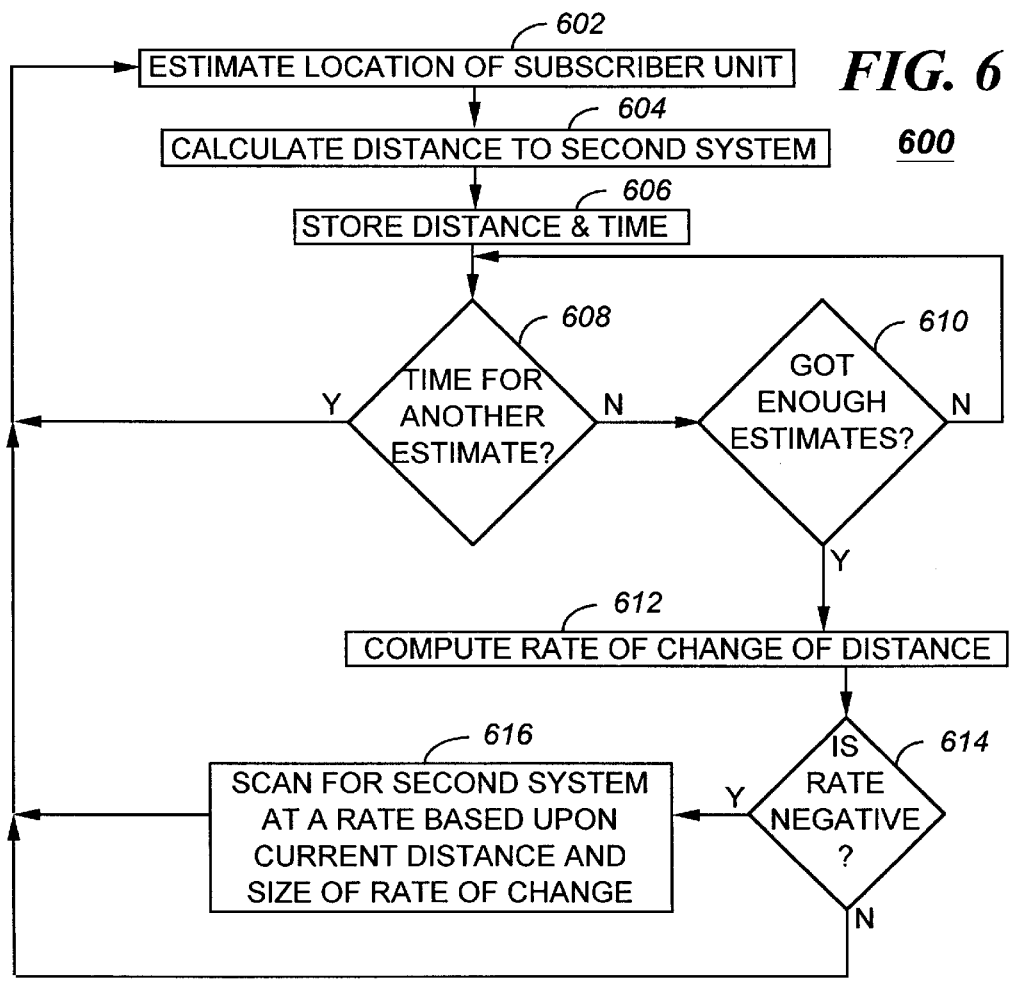
FIG. 6 is a flow diagram depicting operation of the wireless system in accordance with the present invention.

FIG. 6 is a flow diagram 600 depicting operation of the wireless system in accordance with the present invention. The techniques of the diagram 600 are preferred when the subscriber unit 122 is equipped with the GPS receiver 242 for determining location. First, the processing system 206 estimates 602 the location of the subscriber unit 122. The processing system 206 then calculates 604 the distance to the second system, as described herein above. The processing system 206 stores 606 the distance and the current time in the space for distances and timestamps 232. The processing system 206 then checks 608 whether it is time to make another estimate of the location. (Measurements preferably are made at a predetermined rate, e.g., every minute.) If so, the flow returns to step 602 to make another measurement. If not, the processing system 206 checks 610 whether it has made and stored enough, e.g., five, distance and time measurements to proceed. If not, the flow returns to step 608. If so, the processing system 206 preferably computes 612 a rate of change of the distance with respect to time, using well-known techniques. It will be appreciated that the rate of change can be computed as a weighted average, giving more weight to the most recently calculated distances. The processing system 206 then checks 614 whether the rate of change is negative (distance getting smaller). If not, the flow returns to step 602. If the rate of change is negative, the processing system 206 controls the receiver 208 to scan 616 for the second wireless system using a scan rate based upon the last measured distance and the size, i.e., the absolute value, of the rate of change of the distance. For example, the following formula can be used to determine the scan interval I, i.e., 1/(scan rate)

$$I=((D-C)/S)/2,$$

where D is the last measured distance to the second wireless system, C is the nominal coverage radius of the second wireless system, and S is the size of the rate of change in distance. It will be appreciated that many variations of this formula can be devised by one of ordinary skill in the art for determining the scan interval. It will be further appreciated that, alternatively, when the location detection accuracy of the subscriber unit 122 is very good (as in GPS location detection), scanning for the preferred system can be replaced by switching to the preferred system.

Figure 7:
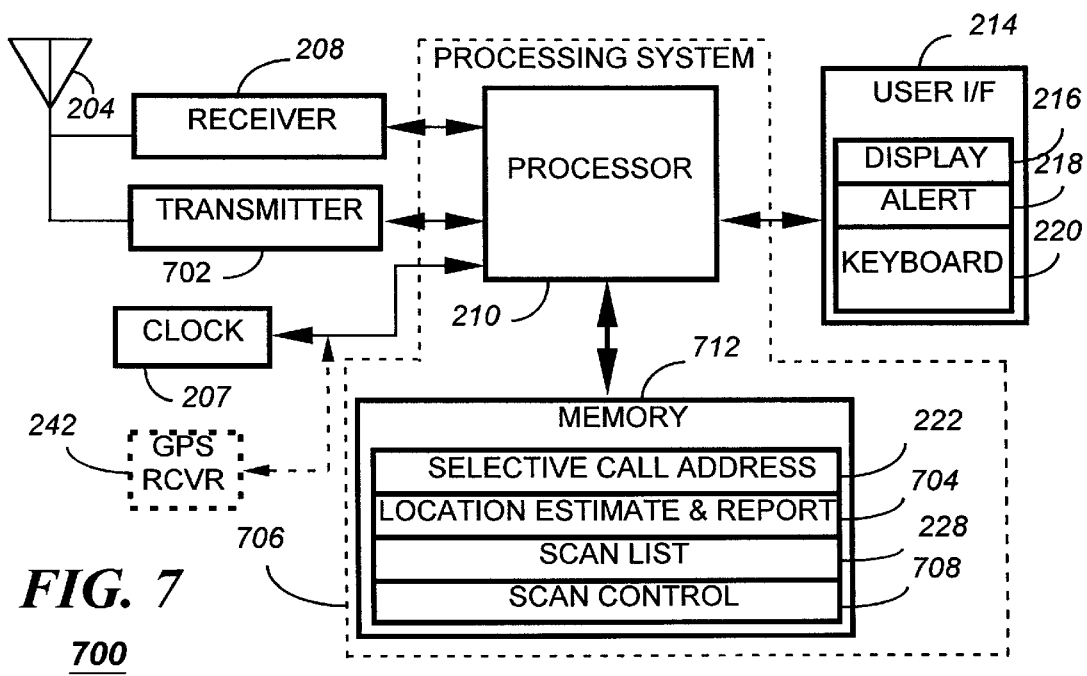
FIG. 7 is an electrical block diagram of an exemplary subscriber unit in accordance with a second embodiment of the present invention.

FIG. 7 is an electrical block diagram of an exemplary subscriber unit 700 in accordance with a second embodiment of the present invention. The subscriber unit 700 is similar to the subscriber unit 122, an essential difference being the addition of a transmitter 702 coupled to the antenna 204 and coupled to the processing system 706 for transmitting inbound messages to the controller 112. Another essential difference is that the system location database 226 and the computational and decision-making programs have been removed from the memory 712. In addition to the selective call address 222, the memory 712 comprises a location estimate and report program 704 for determining the location of the subscriber unit and reporting the location to the controller 112 through the transmitter 702. The memory 712 further comprises the scan list 228 and a scan control program 708. In the second embodiment, the subscriber unit 700 determines its location and reports the location to the controller 112. The controller 112 calculates the distance(s) to other systems and makes a determination as to whether and how often the subscriber unit 700 should be scanning. When the controller 112 wants the subscriber unit to scan, the controller 112 sends a message to the subscriber unit 700 through the base stations 116 telling the subscriber unit 700 to scan at a rate determined by the controller 112. The second embodiment advantageously reduces the memory and processing requirements for the subscriber unit 700, but at the cost of added wireless traffic.

Figure 8:
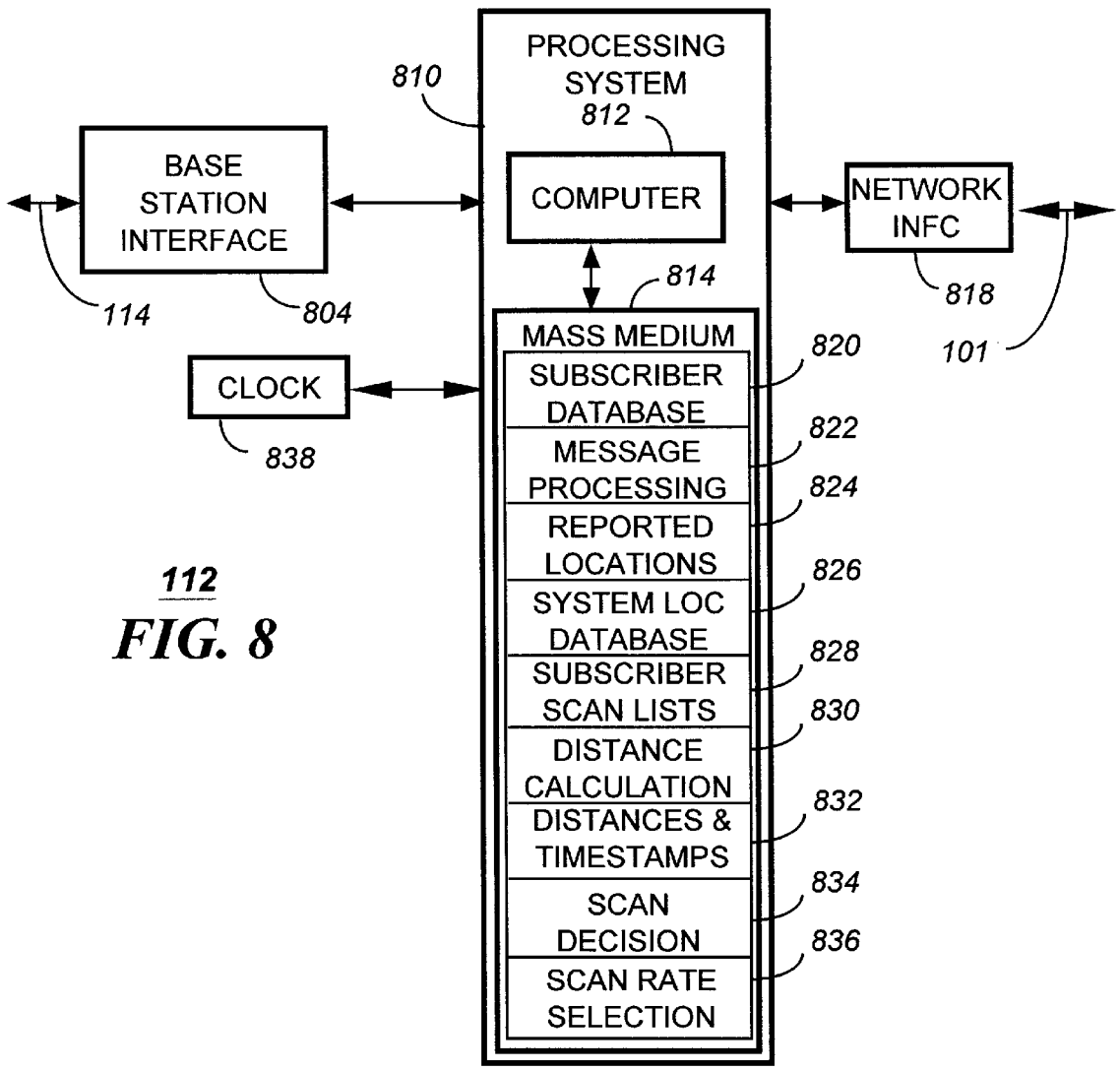
FIG. 8 is an electrical block diagram of an exemplary controller in accordance with the second embodiment of the present invention.

FIG. 8 is an electrical block diagram of an exemplary controller 112 in accordance with the second embodiment of the present invention. The controller 112 comprises a network interface 818 for receiving a message from a message originator via the telephone links 101. The network interface 818 is coupled to a processing system 810 for controlling and communicating with the network interface 818. The processing system is coupled to a base station interface 804 for controlling and communicating with the base stations 116 via the communication links 114. The processing system 810 is also coupled to a conventional clock 838 for providing a timing signal to the processing system 810. The processing system 810 comprises a conventional computer 812 and a conventional mass medium 814, e.g., a magnetic disk drive, programmed with information and operating software in accordance with the present invention. The mass medium 814 comprises a conventional subscriber database 820 for storing profiles defining service for subscribers using the system. The mass medium 814 further comprises a message processing element 822 for processing messages through well-known techniques.

The mass medium 814 also includes a space for storing reported locations 824 received from the subscriber units 700. The mass medium 814 further comprises a system location database 826 including system identifiers and location coordinates of wireless systems of interest to, e.g., within or near, the wireless system controlled by the controller 112. The mass medium 814 also includes space for subscriber scan lists 828 of subscribers registered in the wireless system. Each scan list 828 preferably is obtained from the "home" controller of the corresponding subscriber unit 700, and comprises system identifiers, priorities, and frequencies of systems to which the subscriber unit 700 can roam. The mass medium 814 further comprises a distance calculation program 830 for programming the processing system 810 to calculate the distance between a subscriber unit's reported location and another system preferred by the subscriber unit 700. The mass medium 814 also includes space for storing distances and timestamps 832 computed and saved by the processing system 810. In addition, the mass medium includes a scan decision program 834 for programming the processing system 810 to decide whether a subscriber unit 700 should scan for a preferred system, based on the distance between the subscriber unit 700 and the preferred system. The mass medium also includes a scan rate selection program for programming the processing system 810 to select a scan rate for the subscriber unit 700, based upon the distance.

Operation of the controller 112 and the subscriber unit 700 in accordance with the second embodiment of the present invention is similar to that depicted in the flow diagrams 400, 500, and 600. Regarding the diagram 400, the essential difference is that after the subscriber unit 700 determines its location, the subscriber unit 700 reports its location to the controller 112. The controller 112 then makes the calculations and decisions to determine whether and at what rate the subscriber unit 700 should scan for the second wireless system. When the controller 112 wants the subscriber unit 700 to scan for the second system at a specific rate, the controller 112 communicates that fact to the subscriber unit 700 through an outbound message.

Regarding the diagram 500, the essential difference in the second embodiment is that after the subscriber unit 700 establishes communications with the second wireless system, the subscriber unit 700 will report that fact to the controller 112. The controller 112 will then add the system location information to the system location database 826.

Regarding the diagram 600, the essential difference in the second embodiment is that after the subscriber unit 700 makes a location estimate, the subscriber unit 700 reports the location estimate to the controller 112, which determines whether and at what rate the subscriber unit 700 should scan. When the controller 112 wants the subscriber unit 700 to scan for the second system at a specific rate, the controller 112 communicates that fact to the subscriber unit 700 through an outbound message.

The second embodiment of the present invention advantageously reduces the processing power and memory requirements of the subscriber unit 700. This is accomplished at the cost of substantially increased communication traffic between the subscriber unit 700 and the controller 112, as compared to the first embodiment. For this reason, the first embodiment is considered the preferred embodiment of the present invention.

Thus, it should be clear from the preceding disclosure that the present invention advantageously provides a method and apparatus that intelligently controls scanning for localized systems to eliminate unnecessary scanning without increasing latency.

Many modifications and variations of the present invention are possible in light of the above teachings. Thus, it is to be understood that, within the scope of the appended claims, the invention can be practiced other than as specifically described herein above.

What is claimed is:

1. A method for controlling scanning of a subscriber unit communicating with a first wireless system, comprising the steps of:

determining a location at which the subscriber unit is positioned;

calculating a distance between said location and a second wireless system preferred by the subscriber unit;

deciding whether the subscriber unit will scan for a signal from the second wireless system, based upon said distance; and in response to deciding to scan, selecting a scanning rate based upon said distance, such that more frequent scans will occur as the distance becomes shorter.

2. The method of claim 1, wherein the deciding step comprises the steps of:

storing said distance and a time stamp therefor in a memory of the subscriber unit;

estimating, from the time stamp and a current time, a potential displacement from said distance, using a predetermined maximum speed, in response to becoming unable to determine where the subscriber unit is located; and activating scanning when the potential displacement could place the subscriber unit within range of the second wireless system.

3. The method of claim 1, wherein the deciding step comprises the steps of:

storing said location, said distance, and a time stamp therefor in a memory of the subscriber unit;

selecting an assumed maximum speed based upon said location, using information stored in the memory;

estimating, from the time stamp and a current time, a potential displacement from said distance, using the assumed maximum speed, in response to becoming unable to determine where the subscriber unit is located; and activating scanning when the potential displacement could place the subscriber unit within range of the second wireless system.

4. The method of claim 1, wherein the calculating step utilizes system location information recorded in a location database, and wherein the method further comprises the steps of:
establishing communications with the second wireless system;

discovering that the system location information for the second wireless system is not recorded in the location database; and adding the system location information for the second wireless system in response to the discovering step.

5. The method of claim 1, wherein the determining step comprises the step of estimating a plurality of locations at which the subscriber unit is positioned at a predetermined plurality of times; and wherein the calculating step comprises the steps of:
calculating a plurality of distances between said plurality of locations and the second wireless system; and resolving, from the plurality of distances, a rate of change of the distance between the subscriber unit and the second wireless system; and wherein the deciding step comprises the steps of:
choosing to scan when said rate of change is negative, and not to scan when said rate of change is positive.

6. The method of claim 5, wherein said rate of change has a size, and wherein the choosing step comprises the step of selecting a scanning rate based upon the size of said rate of change.

7. A subscriber unit communicating with a first wireless system for controlling scanning, the subscriber unit comprising:

a receiver for receiving the first wireless system; and a processing system coupled to the receiver for controlling the receiver, the processing system comprising a memory, wherein the processing system is programmed to:

determine a location at which the subscriber unit is positioned;

calculate a distance between said location and a second wireless system preferred by the subscriber unit;

decide whether the subscriber unit will scan for a signal from the second wireless system, based upon said distance; and in response to deciding to scan, select a scanning rate based upon said distance, such that more frequent scans will occur as the distance becomes shorter.

8. The subscriber unit of claim 7, wherein the processing system is further programmed to:

store said distance and a time stamp therefor in the memory;

estimate, from the time stamp and a current time, a potential displacement from said distance, using a predetermined maximum speed, in response to becoming unable to determine where the subscriber unit is located; and activate scanning when the potential displacement could place the subscriber unit within range of the second wireless system.

9. The subscriber unit of claim 7, wherein the processing system is further programmed to:

store said location, said distance, and a time stamp therefor in the memory;

select an assumed maximum speed based upon said location, using information stored in the memory;

estimate, from the time stamp and a current time, a potential displacement from said distance, using the assumed maximum speed, in response to becoming unable to determine where the subscriber unit is located; and activate scanning when the potential displacement could place the subscriber unit within range of the second wireless system.

10. The subscriber unit of claim 7, wherein the memory includes a location database for recording system location information, and wherein the processing system is further programmed to:
establish communications with the second wireless system;

discover that the system location information for the second wireless system is not recorded in the location database; and adding the system location information for the second wireless system in response.

11. The subscriber unit of claim 7, wherein the processing system is further programmed to:

estimate a plurality of locations at which the subscriber unit is positioned at a predetermined plurality of times;

calculate a plurality of distances between said plurality of locations and the second wireless system;

resolve, from the plurality of distances, a rate of change of the distance between the subscriber unit and the second wireless system; and choose to scan when said rate of change is negative, and not to scan when said rate of change is positive.

12. The subscriber unit of claim 11, wherein said rate of change has a size, and wherein the processing system is further programmed to select a scanning rate based upon the size of said rate of change.

13. A controller in a first wireless system communicating with a subscriber unit utilizing two-way communication, the controller for controlling scanning of the subscriber unit, the controller comprising;

a base station interface for cooperating with a base station to provide two-way communications with the subscriber unit; and a processing system coupled to the base station interface for controlling the base station interface, the processing system comprising a memory, wherein the processing system is programmed to:

receive from the subscriber unit a location at which the subscriber unit is positioned;

calculate a distance between said location and a second wireless system preferred by the subscriber unit;

make a decision as to whether the subscriber unit will scan for a signal from the second wireless system, based upon said distance;

in response to deciding the subscriber unit will scan, selecting a scanning rate based upon said distance, such that more frequent scans will occur as the distance becomes shorter; and communicate the decision and the scanning rate to the subscriber unit.

14. The controller of claim 13, wherein the processing system is further programmed to:

store said distance and a time stamp therefor in the memory;

estimate, from the time stamp and a current time, a potential displacement from said distance, using a predetermined maximum speed, in response to receiving a report from the subscriber unit that the subscriber unit is unable to determine where it is located; and activate scanning in the subscriber unit when the potential displacement could place the subscriber unit within range of the second wireless system.

15. The controller of claim 13, wherein the processing system is further programmed to:

store said location, said distance, and a time stamp therefor in the memory;

select an assumed maximum speed based upon said location, using information stored in the memory;

estimate, from the time stamp and a current time, a potential displacement from said distance, using the assumed maximum speed, in response to becoming unable to determine where the subscriber unit is located; and activate scanning in the subscriber unit when the potential displacement could place the subscriber unit within range of the second wireless system.

16. The controller of claim 13, wherein the processing system is further programmed to:

estimate a plurality of locations at which the subscriber unit is positioned at a predetermined plurality of times;

calculate a plurality of distances between said plurality of locations and the second wireless system;

resolve, from the plurality of distances, a rate of change of the distance between the subscriber unit and the second wireless system; and choose to command the subscriber unit to scan when said rate of change is negative, and not when said rate of change is positive.

17. The controller of claim 16, wherein said rate of change has a size, and wherein the processing system is further programmed to select a scanning rate based upon the size of said rate of change.

* * * * *